United States Patent
Zu et al.

(10) Patent No.: US 12,444,980 B2
(45) Date of Patent: Oct. 14, 2025

(54) WIRELESS CHARGING AT SUBSTANTIALLY UNIFORM CHARGE RATE FOR DIFFERENT PHYSICAL CHARGE CONFIGURATIONS

(71) Applicant: Microsoft Technology Licensing, LLC, Redmond, WA (US)

(72) Inventors: Hanming Zu, Redmond, WA (US); Daniel Dhondt, Sammamish, WA (US); Casey Callan, Seattle, WA (US); Xin Huang, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 739 days.

(21) Appl. No.: 17/746,089

(22) Filed: May 17, 2022

(65) Prior Publication Data

US 2023/0299614 A1    Sep. 21, 2023

Related U.S. Application Data

(60) Provisional application No. 63/321,358, filed on Mar. 18, 2022.

(51) Int. Cl.
*H02J 50/10*    (2016.01)
*H02J 50/00*    (2016.01)
*H02J 50/70*    (2016.01)

(52) U.S. Cl.
CPC ............ *H02J 50/10* (2016.02); *H02J 50/005* (2020.01); *H02J 50/70* (2016.02)

(58) Field of Classification Search
CPC .......... H02J 50/10; H02J 50/005; H02J 50/70; H02J 50/12
See application file for complete search history.

(56) References Cited

U.S. PATENT DOCUMENTS

| | | | |
|---|---|---|---|
| 7,663,602 B2 | 2/2010 | Jones et al. | |
| 8,089,468 B2 | 1/2012 | Locker et al. | |
| 8,129,939 B2 | 3/2012 | Locker et al. | |
| 9,106,095 B2 | 8/2015 | Tom et al. | |
| 9,780,573 B2 * | 10/2017 | McCauley | .............. H01F 27/36 |
| 9,998,166 B2 | 6/2018 | Kim et al. | |

(Continued)

OTHER PUBLICATIONS

Dogra, Sarthak, "Dell Creates History with World's First Wireless Charging Laptop", Retrieved from: https://www.news18.com/news/tech/dell-creates-worlds-first-wireless-charging-laptop-2-in-1-wireless-keyboard-1459817.html, Jul. 13, 2017, 2 Pages.

(Continued)

*Primary Examiner* — Eric D Lee
(74) *Attorney, Agent, or Firm* — Holzer Patel Drennan

(57) ABSTRACT

A wireless charging system for a planar wireless accessory includes a receiving coil positioned within the planar wireless accessory and a transmitting coil positioned within a planar electronic device. The transmitting coil generates a magnetic flux that is received by the receiving coil to charge a battery of the planar wireless accessory when the planar wireless accessory is positioned relative to the planar electronic device according to a select charging configuration of multiple user-selectable charging configurations. The transmitting coil and the receiving coil are shaped and positioned to charge the battery at a substantially uniform rate at each different one of the multiple user-selectable charging configurations.

20 Claims, 6 Drawing Sheets

(56) References Cited

U.S. PATENT DOCUMENTS

| | | |
|---|---|---|
| 10,181,747 B2 | 1/2019 | Bowers et al. |
| 10,263,451 B2 | 4/2019 | Konanur et al. |
| 10,523,276 B2* | 12/2019 | Stone ........................ H04B 5/79 |
| 2013/0043734 A1* | 2/2013 | Stone ...................... H02J 50/60 |
| | | 307/104 |
| 2014/0333151 A1* | 11/2014 | Matsui .................... H02J 50/12 |
| | | 307/104 |
| 2015/0222129 A1* | 8/2015 | McCauley ............ H01F 27/363 |
| | | 307/104 |
| 2016/0141097 A1* | 5/2016 | Oo ......................... H01F 5/003 |
| | | 320/108 |
| 2021/0018989 A1 | 1/2021 | Nakata et al. |
| 2022/0311283 A1* | 9/2022 | Wu ........................ H04B 5/263 |

OTHER PUBLICATIONS

"International Search Report and Written Opinion issued in PCT Application No. PCT/US22/054308", Mailed Date: Apr. 25, 2023, 10 Pages.

\* cited by examiner

WIRELESS CHARGING AT SUBSTANTIALLY UNIFORM CHARGE RATE FOR DIFFERENT PHYSICAL CHARGE CONFIGURATIONS

CROSS-REFERENCE TO RELATED APPLICATIONS

The present application claims benefit of priority to U.S. provisional application No. 63/321,358, entitled "Wireless Charging at Substantially Uniform Charge Rate to Support Different Physical Configurations of Use," and filed on Mar. 18, 2022, which is hereby incorporated by reference for all that it discloses or teaches.

BACKGROUND

Wireless charging systems are growing in popularity for a number of reasons including ease-of-use and sleek designs that lack charging ports and therefore offer improved device durability when exposed to elements such moisture, dust, and dirt.

DETAILED DESCRIPTION

Figure 1:
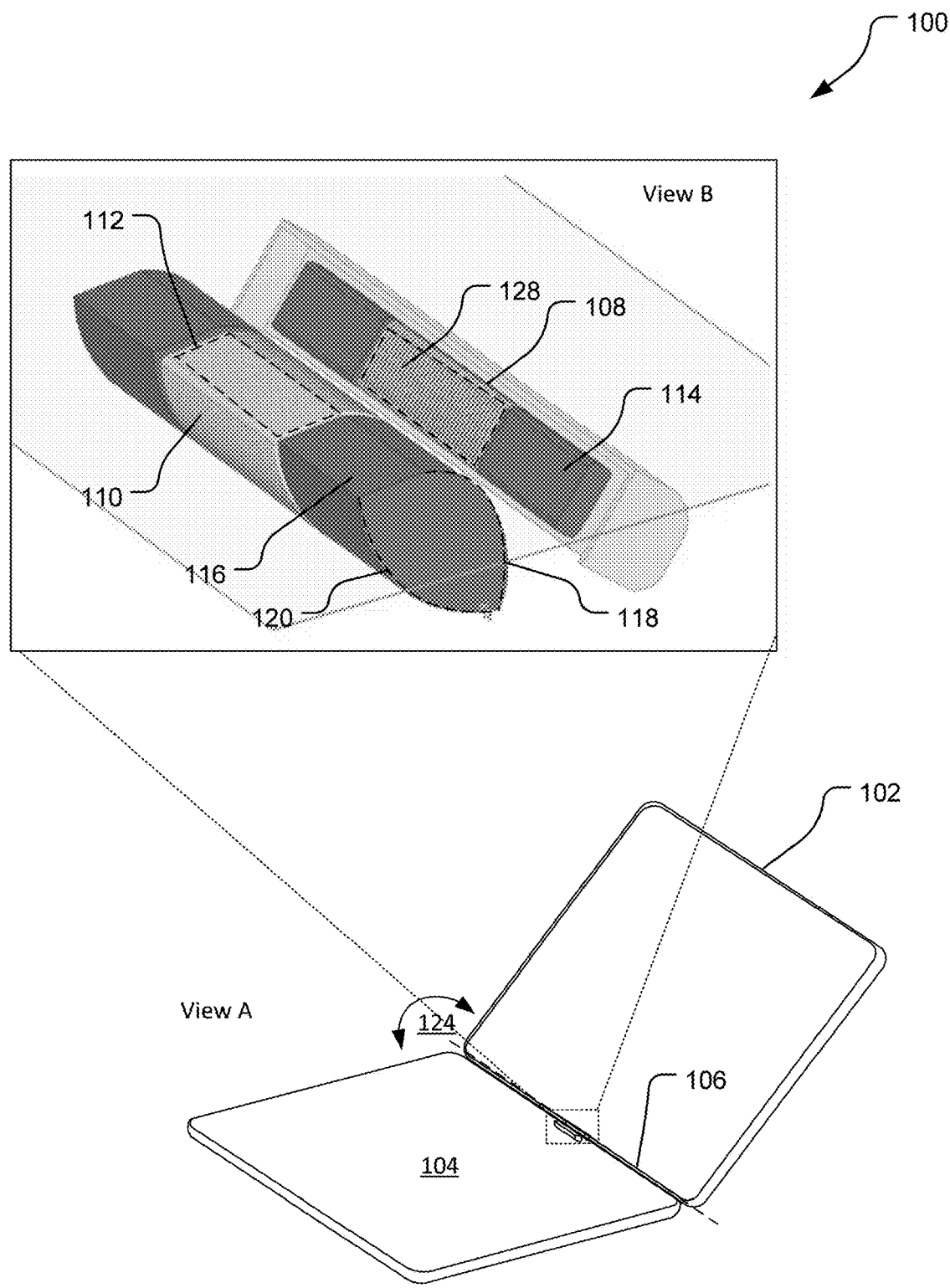
FIG. 1 illustrates an example wireless charging system with a planar device that serves as a charging source for a planar accessory and that delivers a substantially uniform rate of charge to the planar accessory at each of multiple different user-selectable configurations of the planar accessory relative to the planar device.

Wirelessly charging systems are typically designed to maximize charge rate when a wireless accessory and a charging source are fixed relative to one another in a predesignated charging alignment. Effective wireless charging often depends on the existence of a precise alignment between a transmission coil in the charging source and a receiving coil in the electronic device or accessory. For this reason, some existing devices incorporate magnets or other feature to help "lock" the transmitting and receiving coils into a singular, desired alignment for charging.

In a common arrangement, a wireless charging system includes a transmitting coil in the charging source and a receiving coil in the wireless accessory. The two coils are positioned with their helical axes parallel to one another (e.g., two solenoids laying on their sides, stacked). In another common arrangement, the receiving coil and the charging coil are disk-shaped coils aligned parallel to each other with their axis aligned co-linear. In each of these charging configurations, the transmitting and receiving coils have similar or identical cross-sectional shapes to maximize charging efficiency for a single charging configuration. No alternative charging configurations are supported.

Outside a solenoid, at approximately one solenoid length distance to the solenoid axis, the magnetic field decays in proportion to the square of distance from the solenoid. Therefore, even small changes in separation between the transmitting coil and receiving coil cause large deviations in flux received at the receiving coil. When a wireless charging accessory is not in exact alignment with a predesignated charging position, charging either does not occur or occurs at a highly sub-optimal rate. In many devices, deviations in charge rate greater than about 20% from a target charge rate can cause significant performance problems.

There exist certain accessories that would exhibit enhanced performance and/or significantly improve the user experience if capable of being charged, at a substantially uniform charge rate, in multiple positions relative to a charging source. For example, a tablet may be designed for adjustable use and/or storage while attached to a wireless keyboard accessory at a range of different relative angles, each of which may be associated with a different relative distance between a transmitting coil in the tablet and a receiving coil in the keyboard accessory. If the keyboard accessory is able to charge effectively at only a single position, the user may have to stop work and/or put the keyboard into a position different than a preferred use position to wait for the battery to recharge.

The herein disclosed technology provides a wireless charging system that ensures a substantially uniform rate of wireless charge at each of multiple different selectable positions of a wireless accessory relative to a charging source. According to one implementation, a charging source is incorporated into a planar electronic device that is designed to mate with a wireless accessory that is also planar in shape. When in use, the wireless accessory and planar electronic device are mated along a shared edge. The wireless accessory is configured to rotate relative to the planar electronic device about the edge and/or to be fixed relative to the planar electronic device at multiple different user-selectable positions corresponding to different user-selectable relative angles between the wireless accessory and the planar electronic device. The electronic device includes a transmitting coil that delivers a magnetic flux to a receiving coil in the wireless accessory, thereby inductively charging the wireless accessory. The transmitting coil and the receiving coil are shaped and positioned in a manner that causes that the accessory to be wirelessly charged at a substantially uniform charge rate at each of the multiple different user-selectable relative angles for which charging is supported. Specifically, the receiving coil has an asymmetric shape along two different axes. This asymmetrical shape contributes to capture, at the receiving coil, of magnetic flux that remains substantially uniform as distance is varied between the transmitter coil and the receiver coil in different configurations of the multiple user-selectable charging configurations.

In one implementation, the wireless accessory is charged at a substantially uniform charge rate when positioned at any of multiple different user-selectable relative angles within a range of nominal use angles between the planar electronic device and the wireless accessory. In another implementation, the wireless accessory is charged at the substantially uniform charge rate when the relative angle is 0 degrees (e.g., when the wireless accessory is in a stowed position) and also when the relative angle is within the range of nominal use angles. The nominal use angles may, for example, be obtuse angles between 120 and 135 degrees.

In one example use case, a tablet serves as the charging source that wirelessly charges a keyboard accessory at a range of different relative angles. In another example use case, the charging source and wireless accessory are both displays in a foldable, multi-display device. Other use cases consistent with the following description may likewise embody the charging the technology described with respect to the following figures.

As used herein, "substantially uniform charge rate" or "substantially the same charge rate" refers to a charge rate that deviates by less than 20%. In many of the implementations disclosed here, charge rate deviations associated with different charging positions vary by less than 10 percent. In one implementation, charging efficiencies of the proposed design are at or higher than 69%, which is higher than that achieved in designs that utilized cylindrical solenoids for both the charging and transmitting coils.

FIG. 1 illustrates an example wireless charging system 100 with a planar device 102 that serves as a charging source for a planar accessory 104. The planar device 102 delivers a substantially uniform rate of charge to the planar accessory 104 at each of multiple different user-selectable configurations of the planar accessory 104 and the planar device 102. In FIG. 1, the planar accessory 104 is shown to be a keyboard and the planar device 102 is shown to be a tablet; however, in other implementations the planar accessory 104 and planar device 102 may assume a variety of different including that of dual displays connected at a central hinge.

In one implementation, the relative angle 124 is a user-selectable angle that can be selected from a defined range of angles for which wireless charging is supported at the substantially uniform charge rate. For example, the edge interface 106 may include a hinge or hinge-like mechanism that supports movement of the planar accessory 104 relative to the planar device 102 around an axis extending along the edge interface 106 to vary the relative angle 124. In other implementations, the planar accessory 104 and planar device 102 do not rotate relative to one another while attached/touching but are instead designed to be selectably coupled (e.g., snapped together) at positions corresponding to different values of the relative angle 124.

In FIG. 1, components of the wireless charging system 100 are shown positioned near the edge interface 106. As shown in view B, the planar device 102 includes a transmitting coil 108 and the planar accessory 104 includes a receiving coil 110. When an electric current is transmitted through the transmitting coil 108, a magnetic field is generated. Receipt of the magnetic flux at the receiving coil 110 induces a proportional current in the receiving coil 110, which in turn charges a battery (not shown) of the planar accessory 104.

In various implementations, the transmitting coil 108 and the receiving coil 110 may assume different shapes and/or sizes selectably tuned so as to provide a substantially uniform charge rate of the planar accessory 104 at different selectable use configurations associated with different values of the relative angle 124 between the planar accessory 104 and the planar device 102. As mentioned above, magnetic flux received by the receiving coil decays in proportion to square of the distance between transmitting coil and receiving coil. Therefore, different coil shapes and sizes may be desirable for use in products with different physical features such as different edge shapes, coil size, and coil placement, to ensure that small changes in separation between the transmitting coil 108 and the receiving coil 110 are not characterized by dramatic changes in the magnetic flux that is received by the receiving coil 110.

In the disclosed design, the transmitting coil 108 and the receiving coil 110 are shaped differently from one another to guarantee substantially constant flux capture when (1) the relative angle 124 is zero degrees (e.g., the planar accessory 104 is stacked relative to the planar device 102, also referred to herein as the zero-degree charge configuration) and also when (2) the relative angle 124 is set to an angle within a predefined range of "nominal use angles" which refers to a predefined range of obtuse angles for which wireless charging is supported.

Many existing products utilize transmitting and receiving coils that have rectangular cross-sections because the rectangular shape provides for a particularly high flux transfer efficiency when the two coils are stacked with flat coil sides parallel to one another. In the disclosed design, however, the transmitting coil 108 and the receiving coil 110 move relative to one another as the relative angle 124 is varied. Since flux decays in proportion to the square of distance, the use of transmitting and receiving coil with rectangular cross sections results in significant decreases in flux transfer efficiency for non-zero values of the relative angle 124.

To provide for more uniform flux transfer efficiency both throughout the range of nominal use angles (e.g., values 120-135 degrees for the relative angle 124) and also in the 0-degree charging configuration, the transmitting coil 108 has a rectangular cross section and the receiving coil 110 has an asymmetrical cross section with both flat and rounded portions.

The receiving coil 110 is tuned by way of its asymmetrical cross-sectional shape such that, as the relative angle 124 is altered, the effective cross section of the receiving coil 110 intersecting the magnetic flux is also altered. For example, an effective cross-sectional area of wire loop receiving the magnetic field is, by design, smaller when the separation between the transmitting coil 108 and the receiving coil 110 is at a minimum and larger when the separation between the transmitting coil 108 and the receiving coil 110 is at a maximum. The exact differences in shape are tuned such that the flux strength received is substantially uniform at these minimum and maximum separations as well all other supported charging configurations corresponding to other values of the relative angle 124.

In the design shown in FIG. 1, the transmitting coil 108 is wrapped around a rectangular ferrite component 114 while the receiving coil 110 is wrapped around an asymmetrical ferrite component 116. In one implementation, the ferrite components 114 and 116 are made of a soft ferrite material that helps to concentrate the magnetic field. The ferrite components 114 and 116 may be dumbbell shaped in some implementations such that a cross-sectional slices taken near the center of either of the ferrite components 114 and 116 are smaller than cross-sectional slices taken near the end of either of the ferrite components 114 or 116.

The rectangular ferrite component 114 defines the rectangular shape of the transmitting coil 108 while the asymmetrical ferrite component 116 defines the asymmetrical shape of the receiving coil 110. The asymmetrical shape of the receiving coil 110 includes a flat portion 112 and two curved side portions (e.g., corresponding to rounded side portions 118 and 120, respectively, of the asymmetrical ferrite component 116). In FIG. 1, the two curved side portions of the receiving coil 110 have curvatures that vary slightly from one another.

In the zero-degree charge position, the flat portion 112 of the receiving coil 110 is facing toward and parallel to a flat portion 128 of the transmitting coil 108. In positions corresponding to the range of nominal use angles, a rounded side portion 118 of the receiving coil faces the flat portion 128 of transmitting coil 108. Since the interface between the flat portion 128 of transmitting coil 108 and the flat portion 112 of the receiving coil provides a flux transfer efficiency that is higher than the interface between flat portion 128 of transmitting coil 108 and the rounded side portion 118 of the receiving coil 110, a distance between the receiving coil 110 and the transmitting coil 108 may be, by design, greater when the relative angle 124 is 0 degrees (when the flat coil portions face one another) than when the relative angle is within the predefined range of nominal use angles (when the flat portion faces the curved portion). By design, this increase in coil-to-coil separation at the 0 degree position of the relative angle 124 reduces the magnetic field at the receiving coil 110. But the bigger cross-section area closer to the transmitter coil that occurs in this configuration (e.g., due to the interfacing flat coil portions 112 and 128) results in a net flux capture at the receiving coil 110 that is substantially similar to the net flux captured by the receiving coil 110 in the configuration corresponding to the predefined range of nominal use angles (e.g., where the rounded portion of the receiving coil 110 faces the transmission coil 108).

According to one implementation, the charge rate of the planar accessory 104 varies by less than 10% when the relative angle 124 is selectively set to each different value within the predefined range of nominal use angles, such as between 120 and 135 degrees. In another implementation, the charge rate of the planar accessory 104 at the zero-degree charge position is substantially the same (e.g., +/−10%) as the charge rate when the relative angle 124 is within the predefined range representative of nominal use angles.

Figure 2A:
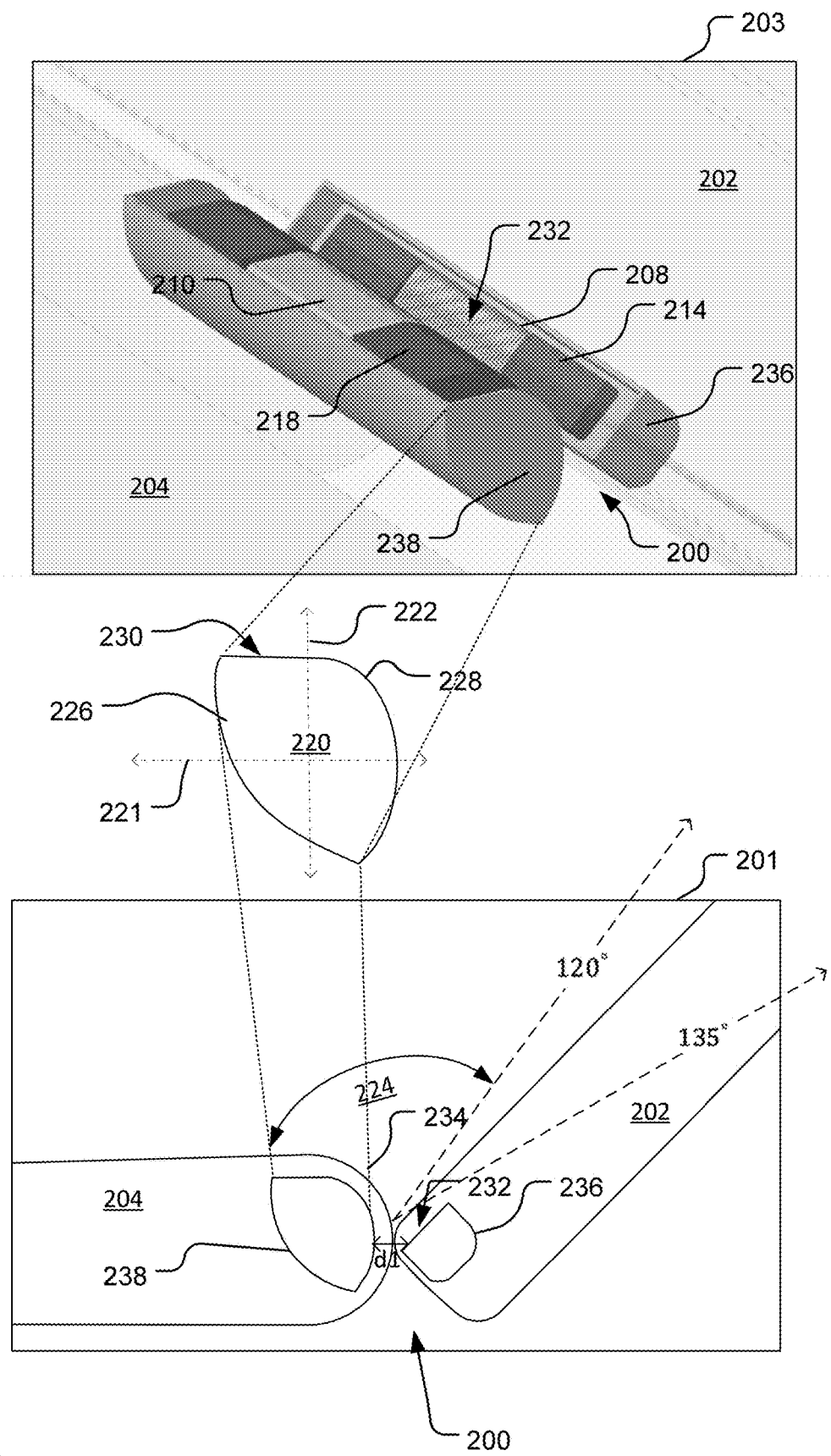
FIG. 2A illustrates views of another example wireless charging system with a planar device that acts as a charging source to provide a substantially uniform rate of charge to a wireless accessory at a multiple different user-selectable physical configurations.

FIG. 2A illustrates views 201, 203 of another example wireless charging system 200 that provides a substantially uniform charge rate to a wireless accessory 204 at a range of different user-selectable angles (e.g., relative angle 224) of the wireless accessory 204 relative to a planar device 202 that includes a charging source. The wireless charging system 200 supports wireless charging of the wireless accessory 204 at the substantially uniform charge rate for both a zero-degree charge position (when the wireless accessory 204 is stowed and stacked with the planar device 202 are stacked such that the relative angle 224 is zero degrees) and also for a predefined range of obtuse angles ("nominal use angles") in which a user is likely to utilize the wireless accessory 204 to interface with the planar device 202. By example, the predefined range of nominal use angles may correspond to a range of values for the relative angle 224 between 120 degrees and 135 degrees. This range may be implementation specific and may vary from one implementation to another.

Within FIG. 2A, a first view 201 illustrates a side profile of a portion of the planar device 202 when mated with the wireless accessory 204 at an angle (the relative angle 224) that selected by a user from a predefined range of nominal use angles for which wireless charging is also supported. A second view 203 is a perspective view of components within the wireless charging system 200 relative to the wireless accessory 204 and the planar device 202 shown in substantially the same physical configuration as the first view 201.

With reference to the second view 203, the wireless charging system 200 is shown to include a rectangular ferrite component 214 that serves as a coiling base for a transmitting coil 208 such that the transmitting coil 208 has a rectangular cross-section. The ferrite component 214 is backed by a transmitter shield 236, which is, for example, an aluminum shield. The wireless charging system 200 further includes an asymmetrical ferrite component 218 that provides a coiling base for a receiving coil 210. The ferrite component 218 is backed by a receiver shield 238. The ferrite component 218, receiver shield 238, and receiving coil 210 all have a cross-sectional profile that is an asymmetrical shape 220. The asymmetrical shape 220 is asymmetrical along two perpendicular axes 221, 222 and includes a flat portion 230 and opposing rounded edge portions 226 and 228 that meet at an edge opposite the flat portion 230.

Notably, the rounded edge portion 228 of the asymmetrical shape 220 has a curvature substantially mirroring a curvature of an outer edge 234 of the wireless accessory 204. This guarantees a maximum amount of flux capture given the constraints of this edge shape. When a user varies the relative angle 224 through the predefined range of nominal use angles, a flat side 232 of the transmitting coil 208 is positioned to face the rounded edge portion 228 of the receiving coil 210.

The use of the rounded edge portion 228 as opposed to, for example, a flat edge, helps mitigate changes in a distance 'd1' between the transmitting coil 208 and the receiving coil 210 that occur as the relative angle 224 is varies throughout the predefined range of nominal use angles for which wireless charging is supported (e.g., 120-135 degrees). By mitigating this coil-to-coil relative distance d1 at each angle within the range of nominal use angles, the magnetic field received at the receiving coil 110 may remain substantially uniform throughout the predefined range of nominal use angles.

Figure 2B:
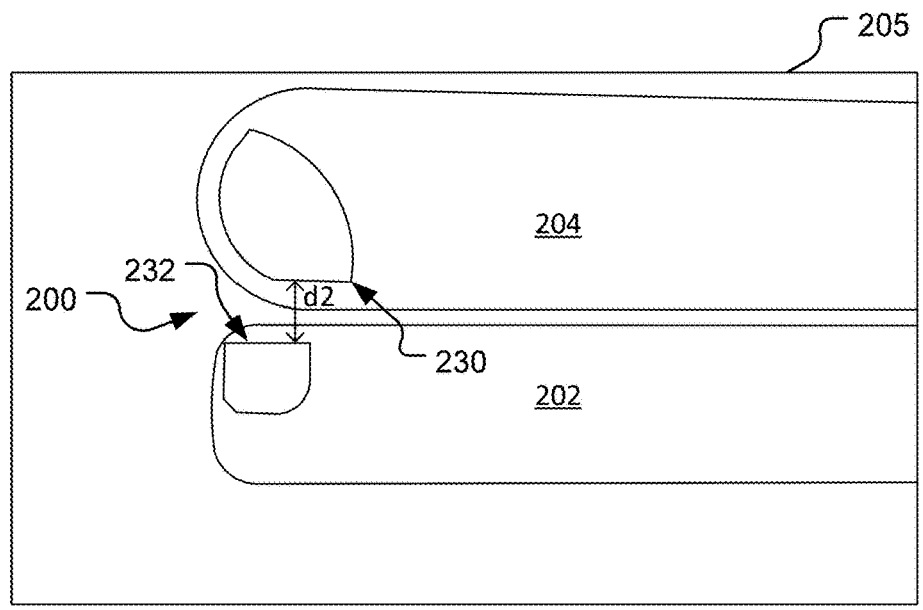
FIG. 2B illustrates additional views of the wireless charging system of FIG. 2A with the planar device and the wireless accessory shown in another physical configuration that supports wireless charging at the substantially uniform rate of charge.
Figure 2B:
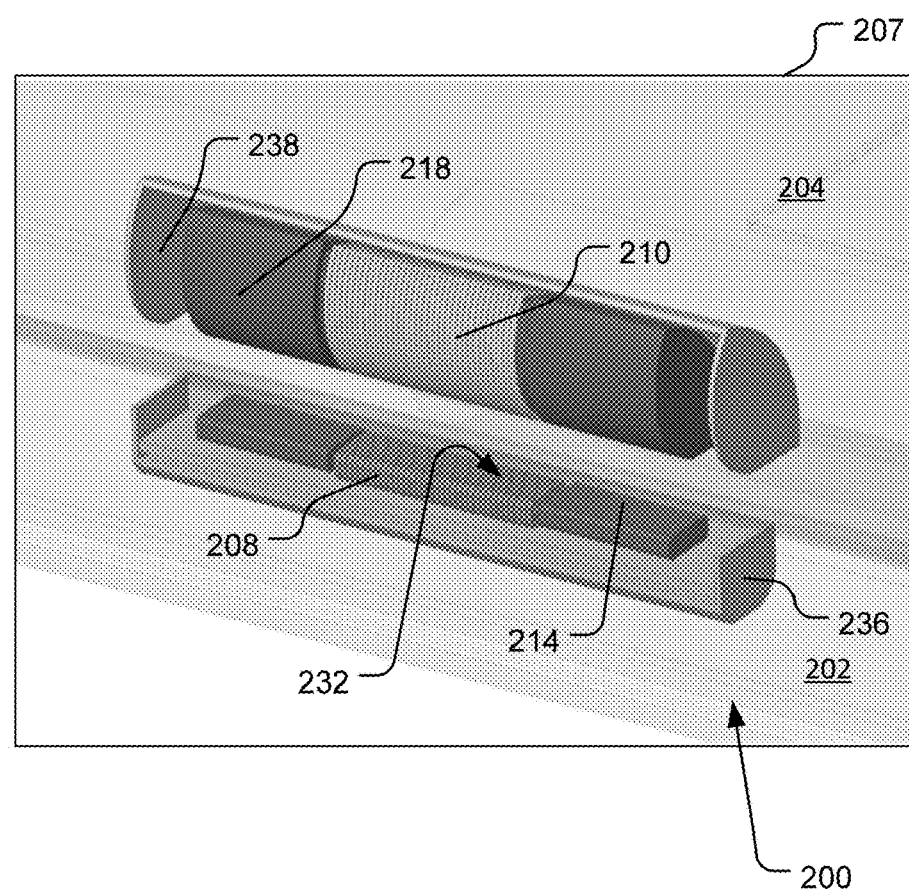

FIG. 2B illustrates additional views 205, 207 of the wireless charging system 200 with the planar device 202 and the wireless accessory 204 shown in a configuration different from that shown in FIG. 2A. Specifically, the views 205, 207 correspond to a charging configuration in which the relative angle 224 (shown in FIG. 2A) is zero degrees and the planar device 202 is stacked on top of and parallel to the wireless accessory 204. This charging configuration is referred to elsewhere herein as the 0-degree charge configuration.

The view 205 illustrates a side profile view of a portion of the planar device 202 and the wireless accessory 204 in the stacked position. The view 207 is a perspective view of the components in the wireless charging system 200 that also corresponds to this same stacked configuration as shown in the view 205.

When a user stacks the wireless accessory 204 and planar device 202 as shown in FIG. 2B, the flat side 232 of the transmitting coil 208 faces and is most proximal to the flat portion 230 of the receiving coil 210. In this configuration, a distance d2 between the transmission coil 208 and the receiving coil 210 is greater than the distance d1, shown in FIG. 2A, that is between the two coils at any of the angles within the predefined range of nominal use angles for which wireless charging is supported.

In the zero-degree charging configuration of FIG. 2B, the magnetic interface formed by the flat side 232 of the transmitting coil 208 and the flat portion 230 of the receiving coil 210 maximizes flux transfer to compensate for field decay that is observed due to the increase in distance from d1 (e.g., when the relative angle 224 is set to an angle within the predefined range of nominal use angles) to d2 in the 0-degree charging configuration. Consequently, flux strength captured by the receiving coil 210 is substantially uniform in the zero-degree charging configuration as compared to the charging configurations represented by the predefined range of nominal use angles described with respect to FIG. 2A.

Although different implementations may provide different characteristics consistent with the technology disclosed herein, one implementation of the disclosed technology ensures that the distance between d1 to d2 changes by less than or equal to a 25% as the relative angle 224 is varied between the zero degree charging position and throughout all angles within the range of nominal use angles for which wireless charging is supported. Table 1, below, illustrates example characteristics consistent with a device incorporating the wireless charging system 200 shown in FIGS. 2A and 2B. In this table, "angle" represents the relative angle 224 and "coil gap" represents the corresponding coil to coil distance (e.g., d1 or d2). As shown, the average power provided to the wireless accessory 204 varies by 0.1 W, or about 6.7% throughout the different supported charging configurations. Observed efficiencies range form 68-71%, which is higher than obtained when both coils are identical in shape (e.g., both with cylindrical cross sections or both with rectangular cross-sections).

TABLE 1.0

| Angle | Avg. Power to Load | Efficiency | Load V Amplitude | Coil Gap |
|---|---|---|---|---|
| 0 | 1.5 W | 68% | 8.6 V | 2.13 mm |
| 120 | 1.4 W | 71% | 8.5 V | 1.62 mm |
| 135 | 1.5 W | 70% | 8.6 V | 1.60 mm |

Notably, other coil cross-sectional shapes may lead to uniform charging. For example, two cylindrical solenoids may provide for a substantially uniform charge rate and efficiency as they rotate 360 degrees as they rotate around each other, provided that the coil-to-coil distance remains uniform. If, however, the coil-to-coil distance is nonuniform (as in the implementation of FIGS. 2A and 2B), the design with two cylindrical solenoid coils does not provide a uniform charge rage and also charges with a much lower efficiency in certain configurations, such as in the range of nominal use angles, making the dual cylindrical solenoid design impractical for the use cases discussed herein.

To compare the charging efficiency of the proposed design of FIG. 2A and FIG. 2B to the dual cylindrical solenoid design discussed above, an alternative model was created with two cylindrical solenoids of the same length and winding dimensions as the design of FIGS. 2A and 2B. In this alternative model, the cylindrical receiver coil has the same cross-sectional area as the receiving coil 210. The separation of the two coils is the same in the zero-degree configuration as in the design of FIGS. 2A and 2B. In this alternative model, the charging efficiency was 49% in the zero degree charge configuration, which is much lower than the corresponding 68% charging efficiency of the disclosed design in this same charging configuration that is reflected in table 1.0 above.

As shown in table 1.0 above, the proposed design of FIGS. 2A and 2B provides for charging efficiencies that range from 68%-71% at all supported charge configurations including the zero-degree charge configuration and the supported range of nominal use angles (e.g., 120 degrees to 135 degrees).

Notably, the view 207 illustrates the transmitter shield 236 and the receiver shield 238 in more detail than that shown with respect to FIG. 2A. The inclusion of these transmitter shield 236 and the receiver shield 238 may help to improve charging efficiency due to surface current that form on the shields and direct magnetic field away. This improvement is particularly pronounced for the transmitter shield 236, which is L-shaped and nested to back the ferrite component 214.

Figure 3:
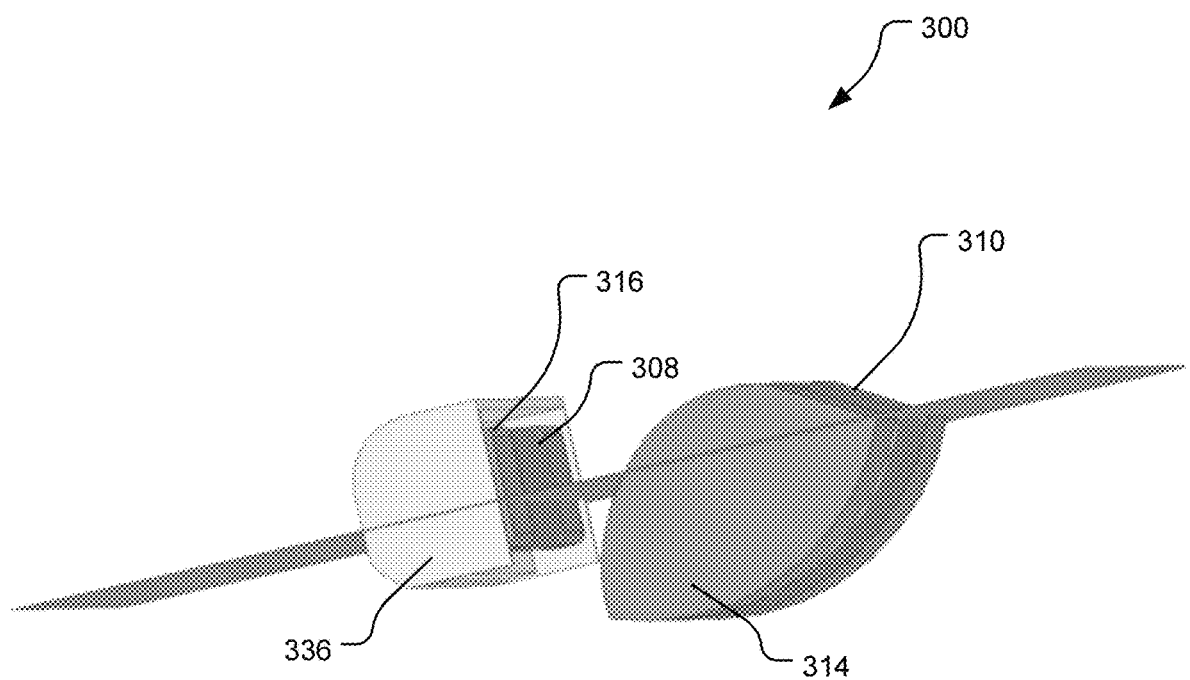
FIG. 3 illustrates further aspects of a wireless charging system that has features consistent with those described with respect to any of FIG. 1, FIG. 2A, or FIG. 2B.

FIG. 3 illustrates further aspects of a wireless charging system 300 that has features consistent with those described with respect to any of FIG. 1, 2A, or 2B. In this view, a transmitter shield 336 is shown nested around a rectangular ferrite component 316 that serves as a coiling base for a transmitter coil 308 with a rectangular cross-section. An asymmetrical ferrite component 314 serves as a coiling base for a receiving coil 310 with an asymmetrical cross section. Although the asymmetrical ferrite component 314 may be nested within a receiver shield in some implementations (such as the implementation of FIG. 2A-2B), this receiver shield is omitted from FIG. 3 to provide additional clarity regarding the asymmetrical cross-sectional shape of the receiving coil 310. Some implementations include the transmitter shield 236 but omit the receiver shield 238 by design.

Figure 4:
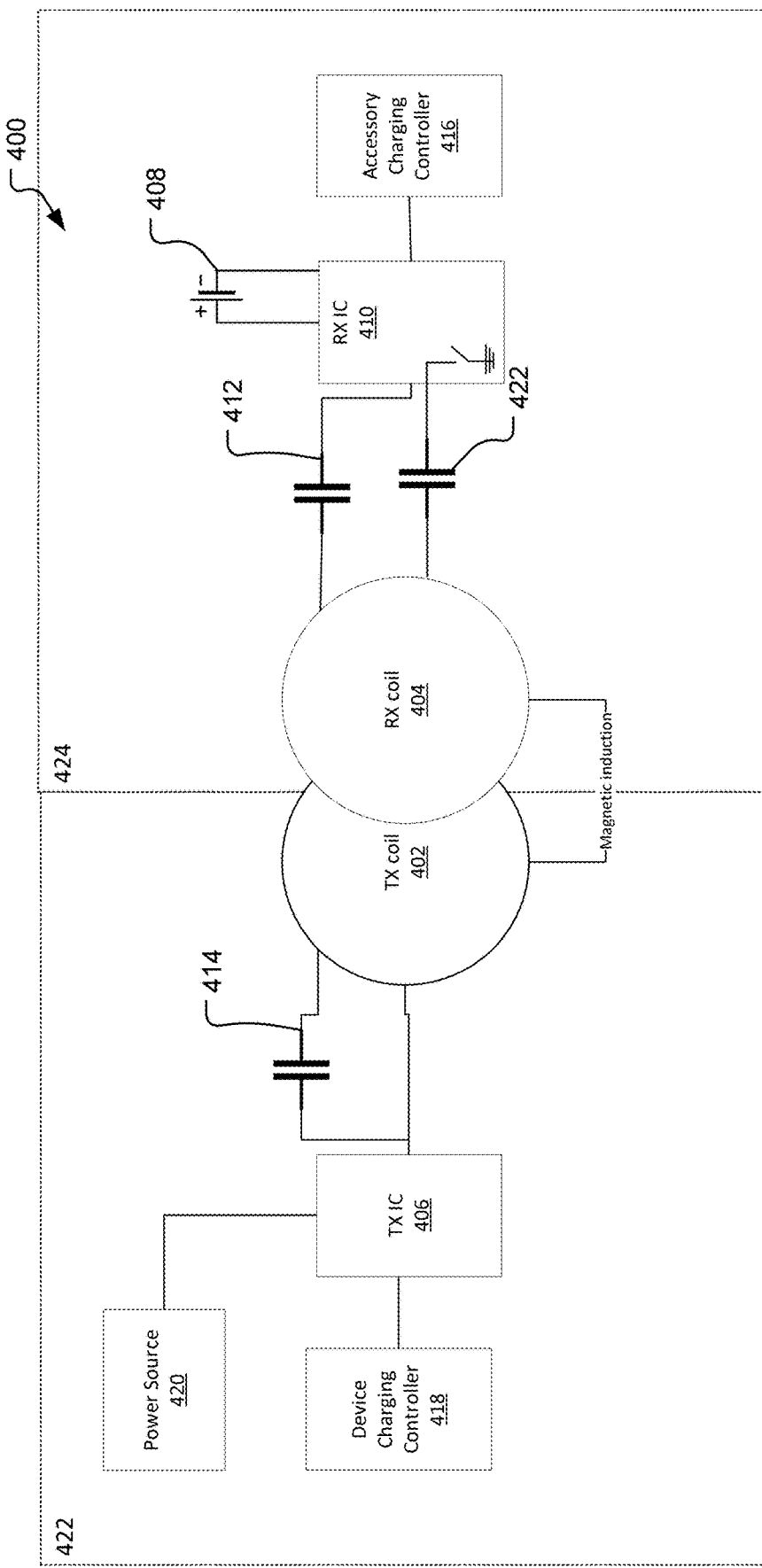
FIG. 4 illustrates a block diagram of an example wireless charging system that delivers a substantially uniform rate of charge a planar accessory at each of multiple user-selectable configurations of the planar accessory relative to a planar device that acts as the charging source.

FIG. 4 illustrates a block diagram of an example wireless charging system 400 that delivers a substantially uniform rate of charge to a planar accessory 424 when the planar accessory 424 is positioned at each of multiple user-selectable configurations relative to a planar device 422 that acts as the charging source. The wireless charging system 400 includes a charge transmission coil 402 embedded in the planar device 422 and a charge receiver coil 404 embedded in the planar accessory 424. The planar device 422 and the planar accessory 424 may have features the same or similar to those shown and described with respect to other figures herein.

In addition to features described elsewhere herein, the wireless charging system 400 includes a communication channel that supports bidirectional data transmissions between the device charging controller 418 and an accessory charging controller 416. Specifically, wireless communications between the device charging controller 418 and the accessory charging controller 416 are achieved by modulating an encoded signal in the current that is flowed through the charge transmission coil 402 and charge receiver coil 404 at various times. In one implementation, this bidirectional communication channel is used to negotiate a quantity of charging current provided to the planar accessory 424 so as to ensure that the planar accessory 424 is receiving enough current to support any actively-supported load-drawing operations while also charging a battery 408 at a charging rate within at a substantially uniform charge rate (e.g., within a predefined acceptable range of charge rates).

To negotiate a rate of charge, the accessory charging controller 416 may, for example, determine a current charge level of the battery 408 and also determine a current load demand on the battery 408 to identify (such as from a stored table) a requested voltage that, if provided to the charge transmission coil 402, is sufficient to support the load while charging the battery 408 at a rate within the predefined acceptable range. Responsive to various predefined events such as changes in the load or battery charge level, the accessory charging controller 416 may generate a request for an increase or decrease in the magnitude of voltage that is provided to the charge transmission coil 402 that is used to inductively charge the battery 408.

The planar accessory 424 includes charging receiver circuitry 410 with hardware that performs coil load amplitude modulation (AM). The hardware may generate a modulated load impedance on RX coil 404, thereby changing the voltage on the TX coil 402 through magnetic field coupling and encoding the request for the voltage change. In one implementation, the planar accessory 424 includes a modulation capacitor 422 connected to the charging receiver circuitry 410 that can be switchably connected to and disconnected from ground (as shown within the charging receiver circuitry 410). When the modulator capacitor 422 is connected to ground, the current flowing through the receiving coil 404 increases to charge this capacitor. By the transformer electromotive force (EMF) equation, the current flowing through the transmitting coil 402 also increases. The device charging controller 418 senses this change and the charging transmission circuitry decodes the encoded request. The received decoded request is then conveyed to the device charging controller 418 which may, in turn, accept the request or respond with a negotiated offer for a voltage level different than that requested by the accessory charging controller 416. For example, the device charging controller 418 may respond with a predefined maximum available voltage rating if the request exceeds the predefined maximum value.

The charging transmission circuitry 406 of the planar device 422 likewise includes a driver and hardware for voltage amplitude modulation (AM) to encode data in outgoing signals transmitted through the charge transmission coil 402, so as to facilitate transmission of an acceptable to a voltage change request or to facilitate negotiation of a different voltage.

In addition to the features discussed above, the charging receiver circuitry 410 may include a voltage rectifier to convert received AC signal to a DC signal that is used to charge the battery 408. Tuning components 412, 414 (e.g., one or more capacitors) are included in the electricals path between each of the charging coils 402 and 404 and their respective charging circuitry 406 or 410. In one implementation, the tuning components 412, 414 add capacitance to the associated electrical paths to help match the impedance in the paths by reducing the inductive load of the respective charging coil 402 or 404. This impedance matching helps to improve the efficiency of the inverter circuitry 406 when driving current through the associated charging coil.

Figure 5:
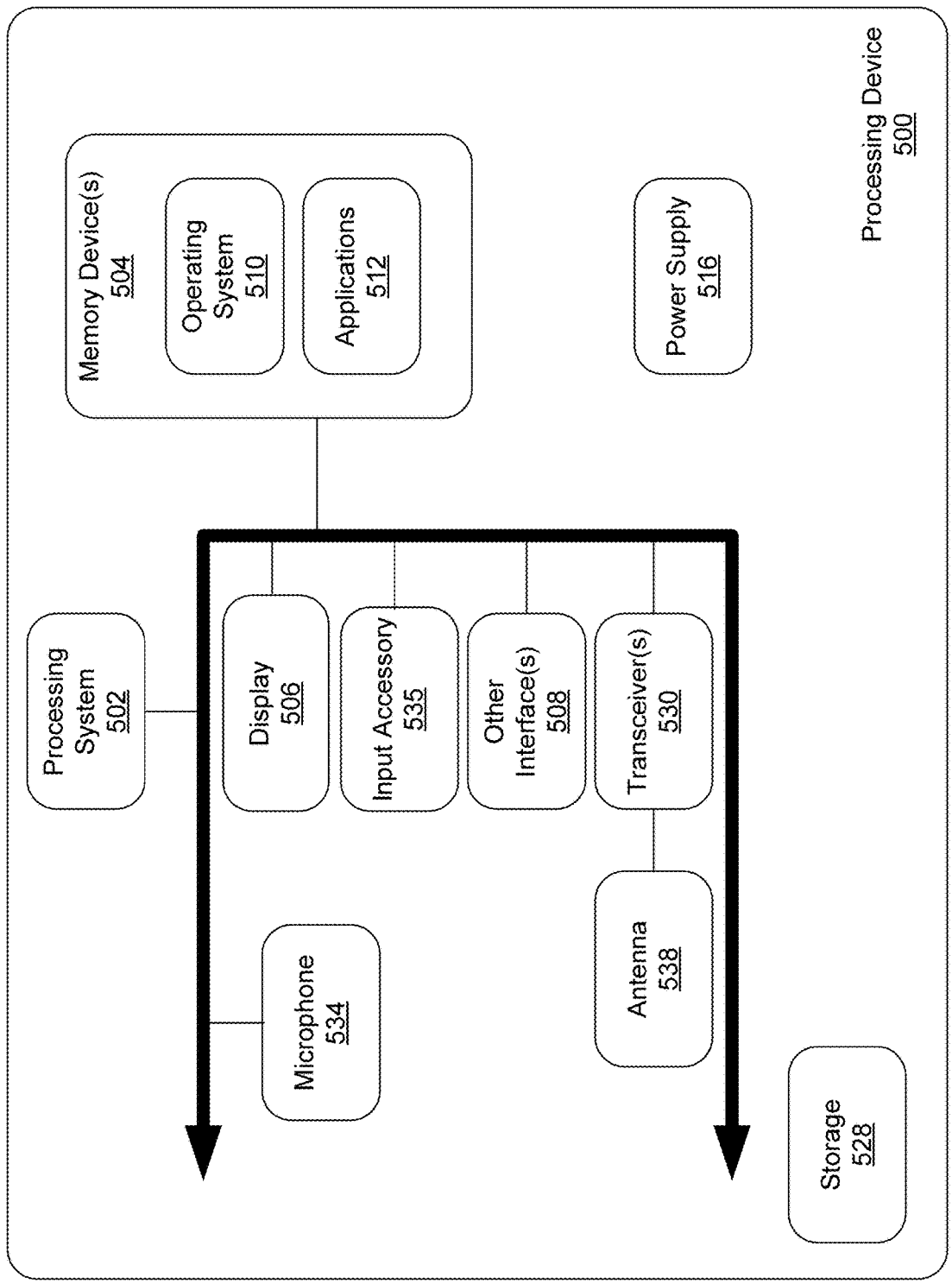
FIG. 5 illustrates an example high level block diagram of a processing device suitable for implementing aspects of the disclosed technology.

FIG. 5 illustrates an example schematic of a processing device 500 suitable for implementing aspects of the disclosed technology. In one implementation, the processing device 500 is a planar accessory that acts as a wireless charging source to charge a planar wireless accessory at a variety of user-selectable angles, as described with respect to any of the figures herein. The processing device 500 includes a power supply 516 that is powered by one or more batteries or other power sources and which provides power to other components of the processing device 500 such as a transmitting coil that generates a magnetic flux that inductively charges the planar wireless accessory.

The processing device 500 further includes a processing system 502, memory 504, the display 506, and other interfaces 508 (e.g., buttons). The memory 504 generally includes both volatile memory (e.g., RAM) and non-volatile memory (e.g., flash memory). An operating system 510 may reside in the memory 504 and be executed by the processing system 502. One or more applications 512 may be loaded in the memory 504 and executed on the operating system 510 by the processing system 5

The processing device 500 includes one or more communication transceivers 530 and an antenna 532 to provide network connectivity (e.g., a mobile phone network, Wi-Fi®, BlueTooth®). The processing device 500 may also include various other components, such as a positioning system (e.g., a global positioning satellite transceiver), one or more accelerometers, one or more cameras, an audio interface (e.g., a microphone 534, an audio amplifier and speaker and/or audio jack), and storage devices 528. Other configurations may also be employed. In an example implementation, a mobile operating system, various applications and other modules and services may be embodied by instructions stored in memory 504 and/or storage devices 528 and processed by the processing system 502. The memory 544 may be memory of host device or of an accessory that couples to a host.

The processing device 500 may include a variety of tangible computer-readable storage media and intangible computer-readable communication signals. Tangible computer-readable storage can be embodied by any available media that can be accessed by the processing device 500 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the processing device 500. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

An example wireless charging system disclosed herein includes a receiving coil positioned within a planar wireless accessory and a transmitting coil positioned within a planar electronic device that generates a magnetic flux received by the receiving coil to charge a battery of the planar wireless accessory when the planar wireless accessory is positioned relative to the planar electronic device according to a select charging configuration of multiple user-selectable charging configurations. The transmitting coil and the receiving coil are shaped and positioned to charge the battery at a substantially uniform rate at each of the multiple user-selectable charging configurations.

In another example wireless charging system of any preceding wireless charging system, the planar electronic device and the planar wireless accessory mate at an edge defining a relative angle of separation between the planar electronic device and the planar wireless accessory. The multiple user-selectable charging configurations correspond to different angles within a range of user-selectable angles for which wireless charging is supported.

In still another example wireless charging system of any preceding wireless charging system, the wireless accessory is wirelessly charged at the substantially uniform rate when the relative angle of separation is zero degrees and also when the relative angle of separation is within a predefined range of nominal use angles that are obtuse.

In yet still another example wireless charging system of any preceding wireless charging system, the transmitting coil has a rectangular cross section.

In still another example of a wireless charging system of any preceding wireless charging system, the receiving coil has a cross section that is of non-rectangular shape and includes at least one rounded edge portion.

In another example wireless charging system of any preceding charging system, the cross-section of the receiving coil has at least one flat edge portion.

In still another example wireless charging system of any preceding charging system, the receiving coil is asymmetrical along a first axis and also asymmetrical along a second axis perpendicular to the first axis.

In another example wireless charging system of any preceding charging system, the asymmetry along the first axis and along the second axis contributes to capture of a magnetic field by the receiving coil that remains substantially uniform as distance is varied between the transmitter coil and the receiver coil in different configurations of the multiple user-selectable charging configurations.

In still another example of a wireless charging system of any preceding wireless charging system, a distance between the transmitter coil and the receiving coil is greater when the relative angle of separation is zero degrees than when the relative angle of separation within the predefined range of nominal use angles.

In still another example of a wireless charging system of any preceding wireless charging system, the wireless charging system includes a transmitter coil shield with an L-shaped cross-sectional profile and a receiver coil shield with an asymmetrical cross-sectional profile.

An example method for wirelessly charging a battery includes generating, at a transmitting coil positioned within a planar electronic device, a magnetic flux; and receiving the generated magnetic flux by a receiving coil positioned within a planar wireless accessory. The transmitting coil and the receiving coil are shaped and positioned relative to one another so as to charge the battery at a substantially uniform rate at each of the multiple user-selectable charging configurations of the planar electronic device relative to the planar wireless accessory.

In an example method of any preceding method, the planar electronic device and the planar wireless accessory mate at an edge defining a relative angle of separation between the planar electronic device and the planar wireless accessory. The multiple user-selectable charging configurations correspond to different angles within a range of user-selectable angles for which wireless charging is supported.

In still another example method of any preceding method, the wireless accessory is wirelessly charged at the substantially uniform rate when the relative angle of separation is zero degrees and also when the relative angle of separation is within a predefined range of nominal use angles that are obtuse.

In still another example method of any preceding method, the transmitting coil has a rectangular cross section and the receiving coil has a cross section that is of non-rectangular shape, and the receiving coil includes at least one rounded edge portion.

In another example method of any preceding method, the cross-section of the receiving coil has at least one flat edge portion.

An example system for wirelessly charging a battery includes a means for generating, at a transmitting coil positioned within a planar electronic device, a magnetic flux; and a means for receiving the generated magnetic flux by a receiving coil positioned within a planar wireless accessory. The transmitting coil and the receiving coil are shaped and positioned relative to one another so as to charge the battery at a substantially uniform rate at each of the multiple user-selectable charging configurations of the planar electronic device relative to the planar wireless accessory.

Still another example wireless charging system disclosed herein includes a receiving coil positioned within a planar wireless accessory and a transmitting coil positioned within a planar electronic device. The transmitting coil includes a flat edge portion and a rounded portion, and the transmitting coil and the receiving coil are shaped and positioned to inductively charge a battery of the planar wireless accessory at a substantially uniform rate at each of multiple user-selectable charging configurations of the planar electronic device relative to the planar wireless accessory.

In another example wireless charging system of any preceding system, wherein a distance between the receiving coil and the transmitting coil is greater in the first one of multiple user-selectable charging configurations than in the second one of the multiple user-selectable charging configurations.

In yet another example wireless charging system of any preceding system, the planar electronic device and the planar wireless accessory mate at an edge defining a relative angle of separation between the planar electronic device and the planar wireless accessory. and wherein the multiple user-selectable charging configurations correspond to different angles within a range of user-selectable angles for which wireless charging is supported.

In still another example wireless charging system of any preceding charging system, the wireless accessory is wirelessly charged at the substantially uniform rate when the relative angle of separation is zero degrees and also when the relative angle of separation is within a predefined range of nominal use angles that are obtuse.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The above specification, examples, and data provide a complete description of the structure and use of exemplary implementations. Since many implementations can be made without departing from the spirit and scope of the claimed invention, the claims hereinafter appended define the invention. Furthermore, structural features of the different examples may be combined in yet another implementation without departing from the recited claims.

What is claimed is:

1. A wireless charging system comprising:
    a receiving coil positioned within a planar wireless accessory; and
    a transmitting coil positioned within a planar electronic device that generates a magnetic flux received by the receiving coil to charge a battery of the planar wireless accessory when the planar wireless accessory is positioned relative to the planar electronic device according to a select charging configuration of multiple user-selectable charging configurations, the transmitting coil and the receiving coil being shaped and positioned to charge the battery at a substantially uniform rate across the multiple user-selectable charging configurations.

2. The wireless charging system of claim 1, wherein the planar electronic device and the planar wireless accessory mate at an edge defining a relative angle of separation between the planar electronic device and the planar wireless accessory and wherein the multiple user-selectable charging configurations correspond to different angles within a range of user-selectable angles for which wireless charging is supported.

3. The wireless charging system of claim 2, wherein the planar wireless accessory is wirelessly charged at the substantially uniform rate when the relative angle of separation is zero degrees and also when the relative angle of separation is within a predefined range of nominal use angles that are obtuse.

4. The wireless charging system of claim 3, wherein a distance between the transmitting coil and the receiving coil is greater when the relative angle of separation is zero degrees than when the relative angle of separation within the predefined range of nominal use angles.

5. The wireless charging system of claim 4, wherein the transmitting coil includes a flat portion, the flat portion of the transmitting coil facing a flat portion of the receiving coil when the relative angle of separation is zero and facing a rounded edge of the receiving coil when the relative angle of separation is within the predefined range of nominal use angles.

6. The wireless charging system of claim 1, wherein the transmitting coil has a rectangular cross section.

7. The wireless charging system of claim 6, wherein the receiving coil has a cross section that is of non-rectangular shape and includes at least one rounded edge portion.

8. The wireless charging system of claim 7, wherein a cross-section of the receiving coil has at least one flat edge portion.

9. The wireless charging system of claim 7, wherein the receiving coil is asymmetrical along a first axis and also asymmetrical along a second axis perpendicular to the first axis.

10. The wireless charging system of claim 9, wherein the asymmetry along the first axis and along the second axis contributes to capture of a magnetic field by the receiving coil that remains substantially uniform as distance is varied between the transmitting coil and the receiving coil in different configurations of the multiple user-selectable charging configurations.

11. The wireless charging system of claim 1, further comprising:
    a transmitting coil shield with an L-shaped cross-sectional profile; and
    a receiving coil shield with an asymmetrical cross-sectional profile.

12. A method for wirelessly charging a battery, the method comprising:
    generating, at a transmitting coil positioned within a planar electronic device, a magnetic flux; and
    receiving the generated magnetic flux by a receiving coil positioned within a planar wireless accessory, the transmitting coil and the receiving coil being shaped and positioned relative to one another so as to charge the battery at a substantially uniform rate across multiple user-selectable charging configurations of the planar electronic device relative to the planar wireless accessory.

13. The method of claim 12, wherein the planar electronic device and the planar wireless accessory mate at an edge defining a relative angle of separation between the planar electronic device and the planar wireless accessory and wherein the multiple user-selectable charging configurations correspond to different angles within a range of user-selectable angles for which wireless charging is supported.

14. The method of claim 13, wherein the planar wireless accessory is wirelessly charged at the substantially uniform rate when the relative angle of separation is zero degrees and also when the relative angle of separation is within a predefined range of nominal use angles that are obtuse.

15. The method of claim 12, wherein the transmitting coil has a rectangular cross section and the receiving coil has a cross section that is of non-rectangular shape, the receiving coil including at least one rounded edge portion.

16. The method of claim 15, wherein the cross section of the receiving coil has at least one flat edge portion.

17. A wireless charging system comprising:
    a receiving coil positioned within a planar wireless accessory; and
    a transmitting coil positioned within a planar electronic device that includes a flat edge portion and a rounded portion, the transmitting coil and the receiving coil being shaped and positioned to inductively charge a battery of the planar wireless accessory at a substantially uniform rate at each of multiple user-selectable charging configurations of the planar electronic device relative to the planar wireless accessory,
    the flat edge portion of the transmitting coil being most proximal to the receiving coil when the planar wireless accessory is positioned in a first one of the multiple user-selectable charging configurations and the rounded portion of the transmitting coil being most proximal to the receiving coil when the planar wireless accessory is positioned in a second one of the multiple user-selectable charging configurations.

18. The wireless charging system of claim 17, wherein a distance between the receiving coil and the transmitting coil is greater in the first one of multiple user-selectable charging configurations than in the second one of the multiple user-selectable charging configurations.

19. The wireless charging system of claim 17, wherein the planar electronic device and the planar wireless accessory mate at an edge defining a relative angle of separation between the planar electronic device and the planar wireless accessory and wherein the multiple user-selectable charging configurations correspond to different angles within a range of user-selectable angles for which wireless charging is supported.

20. The wireless charging system of claim 19, wherein the planar wireless accessory is wirelessly charged at the substantially uniform rate when the relative angle of separation is zero degrees and also when the relative angle of separation is within a predefined range of nominal use angles that are obtuse.

\* \* \* \* \*